United States Patent
Gruber

(10) Patent No.: US 12,323,914 B2
(45) Date of Patent: Jun. 3, 2025

(54) POWER-SAVING SENSOR

(71) Applicant: ECOLINK INTELLIGENT TECHNOLOGY, INC., Carlsbad, CA (US)

(72) Inventor: Brandon Gruber, Carlsbad, CA (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 147 days.

(21) Appl. No.: 16/390,863

(22) Filed: Apr. 22, 2019

(65) Prior Publication Data
US 2020/0333868 A1    Oct. 22, 2020

(51) Int. Cl.
*H04W 52/02*    (2009.01)
*G06F 1/3234*   (2019.01)
*G06F 9/30*     (2018.01)

(52) U.S. Cl.
CPC .......... *H04W 52/02* (2013.01); *G06F 1/325* (2013.01); *G06F 9/3004* (2013.01)

(58) Field of Classification Search
CPC ........ G06F 1/325; G06F 9/3004; H02J 7/025; H04W 52/02
See application file for complete search history.

(56) References Cited

U.S. PATENT DOCUMENTS

| | | | |
|---|---|---|---|
| 2006/0100002 A1 | 5/2006 | Luebke et al. | |
| 2011/0222449 A1* | 9/2011 | Goldberg | H04Q 9/00 370/311 |
| 2012/0066608 A1 | 3/2012 | Sundermeyer et al. | |
| 2015/0098375 A1* | 4/2015 | Ree | H04W 52/0229 370/311 |
| 2015/0116127 A1* | 4/2015 | Lynch | H04W 52/028 340/870.02 |
| 2015/0131500 A1* | 5/2015 | Xie | G08B 25/007 370/311 |
| 2016/0134794 A1* | 5/2016 | Grabau | G06F 1/3215 348/155 |
| 2016/0202127 A1* | 7/2016 | Chong | G01J 5/0859 374/121 |
| 2016/0343237 A1* | 11/2016 | Herman | H04W 4/021 |
| 2017/0061779 A1* | 3/2017 | Kennedy | G08B 13/08 |
| 2017/0267036 A1* | 9/2017 | Tsujita | B60C 23/0435 |

(Continued)

FOREIGN PATENT DOCUMENTS

CN    108882144 A  * 11/2018    ............. H04L 67/12

OTHER PUBLICATIONS

U.S. Appl. No. 16/237,144 titled User-Configurable Person Detection System, Method and Apparatus, filed Dec. 31, 2018, 21 pages.

(Continued)

*Primary Examiner* — Hyun Soo Kim
(74) *Attorney, Agent, or Firm* — Greenberg Traurig, LLP

(57) ABSTRACT

A sensor is disabled when it receives a signal from a control unit that the control unit has been placed into one or more particular operating modes. In response to receiving the signal, the sensor becomes disabled, thereby preventing detection and/or transmission of certain signals to the security panel. When the control unit is placed into another mode of operation, the control unit sends a signal to the sensor and, in response, the sensor is re-enabled, allowing the sensor to function normally.

14 Claims, 4 Drawing Sheets

400 - System In Armed-Away Mode
402 - System Placed Into Armed-Home or Off Mode
404 - Transmit Signal to Sensor
406 - Receive Signal and Provide to Processor
408 - Place Sensor Into Power-Saving Mode
410 - Transmit Acknowledgement
412 - Determine Time to Transmit Heartbeat
414 - Re-Enable Transmitter
416 - Transmit Heartbeat
418 - Disable Transmitter
420 - System Placed in Alternate Mode
422 - Transmit Signal to Sensor
424 - Receive Signal - Provide to Processor
426 - Re-Enable Sensor

(56) References Cited

U.S. PATENT DOCUMENTS

2018/0191596 A1   7/2018  Bhaya et al.
2019/0045280 A1   2/2019  Bambrick

OTHER PUBLICATIONS

ISA/US, Int. Search Report and Written Opinion issued on PCT application No. US20/27003, dated Jun. 25, 2020, 13 pages.
EPO, extended European search report issued on European patent application No. 20796139.2, dated Dec. 15, 2022, 7 pages.

* cited by examiner

Fig. 4

400 - System In Armed-Away Mode
402 - System Placed Into Armed-Home or Off Mode
404 - Transmit Signal to Sensor
406 - Receive Signal and Provide to Processor
408 - Place Sensor Into Power-Saving Mode
410 - Transmit Acknowledgement
412 - Determine Time to Transmit Heartbeat
414 - Re-Enable Transmitter
416 - Transmit Heartbeat
418 - Disable Transmitter
420 - System Placed in Alternate Mode
422 - Transmit Signal to Sensor
424 - Receive Signal - Provide to Processor
426 - Re-Enable Sensor

POWER-SAVING SENSOR

BACKGROUND

I. Field of the Invention

The present invention relates to battery-operated sensors and, more particularly, to a system, method and apparatus to extend battery life for sensors.

II. Description of Related Art

Sensors are used in many industries to determine a characteristic or condition of an environment proximate to the sensors and report such characteristic or condition, or an alert, to a control unit, where the control unit may store a history of characteristics or conditions from various sensors, provide the characteristics or condition to an end user, or automatically make decisions based on the characteristics or conditions and pre-determined thresholds. Examples of such sensors include temperature sensors, pressure sensors, humidity sensors, and security sensors (such as door/window sensors, motion detectors, glass-breakage sensors, etc.). Typically, these sensors are battery-powered, wireless, and therefore not capable of receiving instructions from the control unit, due to the additional battery consumption that a receiver would add.

Sensors are widely used in home security systems. Such home security systems typically comprise a security panel and a number of sensors distributed around the home to detect unauthorized entry and/or movement inside the home. For example, a home may have all of its doors and windows monitored by battery-operated, wireless door or window sensors to detect unauthorized entry, and one or more motion sensors installed at one or more points inside the home for detecting unauthorized movement within the home. Each of the sensors may transmit a wireless signal to the security panel, where the security panel may take further action once a signal has been received, such as to sound a siren inside the home or contact a remote monitoring facility.

One problem with such battery-operated sensors is that they transmit each time that an alarm condition is sensed (i.e., door or window opening or motion detected), whether or not the security system is armed, disarmed or in a "home-armed" state. In fact, sensors are more likely to transmit when a security system is off, or in a home-armed state, as authorized people are generally moving throughout a home, triggering the sensors. Such needless transmissions decrease the battery life of the sensors.

It would be desirable, then, to reduce the number of transmissions of home security sensors in order to extend battery life.

SUMMARY

A system, method and apparatus for reducing power-consumption of sensors used in connection with a control unit. In one embodiment, a battery-operated, wireless, power-saving sensor is described, comprising a detector for detecting a condition occurring proximate to the sensor, a memory for storing processor-executable instructions, a transmitter for sending wireless signals to a control unit, a receiver for receiving wireless signals to the control unit, and a processer coupled to the detector, the memory, the receiver and the transmitter, for executing the processor-executable instructions that causes the sensor to receive, by the processor via the receiver, a first signal from the control unit; and in response to receiving the first signal, disable, by the processor, the sensor.

In another embodiment, a method for reducing power-consumption in a sensor is described, comprising receiving, by a processor via a receiver coupled to the processor, a first signal from the control unit, and in response to receiving the first signal, disable, by the processor, the sensor.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 4 is a flow diagram describing one embodiment of a method, performed by the sensor as shown in FIG. 2 and the and control unit as shown in FIG. 3, for reducing power consumption of the sensor.

DETAILED DESCRIPTION

This disclosure describes a power-saving, battery-powered, wireless sensor. Such as sensor may be configured for two-way wireless communication and receive notifications or commands from a control unit to disable the sensor, so that it no longer detects and/or transmits. In one embodiment, the control unit comprises a home security panel, the sensor comprises a security sensor such as a door or window sensor, motion sensor, glass break detector, etc., and the notifications comprise a command to disable the sensor, or simply a status of a home security system, such as when the system has been placed into an "off" state or in a "home-armed" state. When the security system is placed into an armed-away mode of operation, the security panel sends a signal to the security sensor and, in response, the sensor is re-enabled, allowing the sensor to detect and report alarm conditions to the security panel once again.

Figure 1:
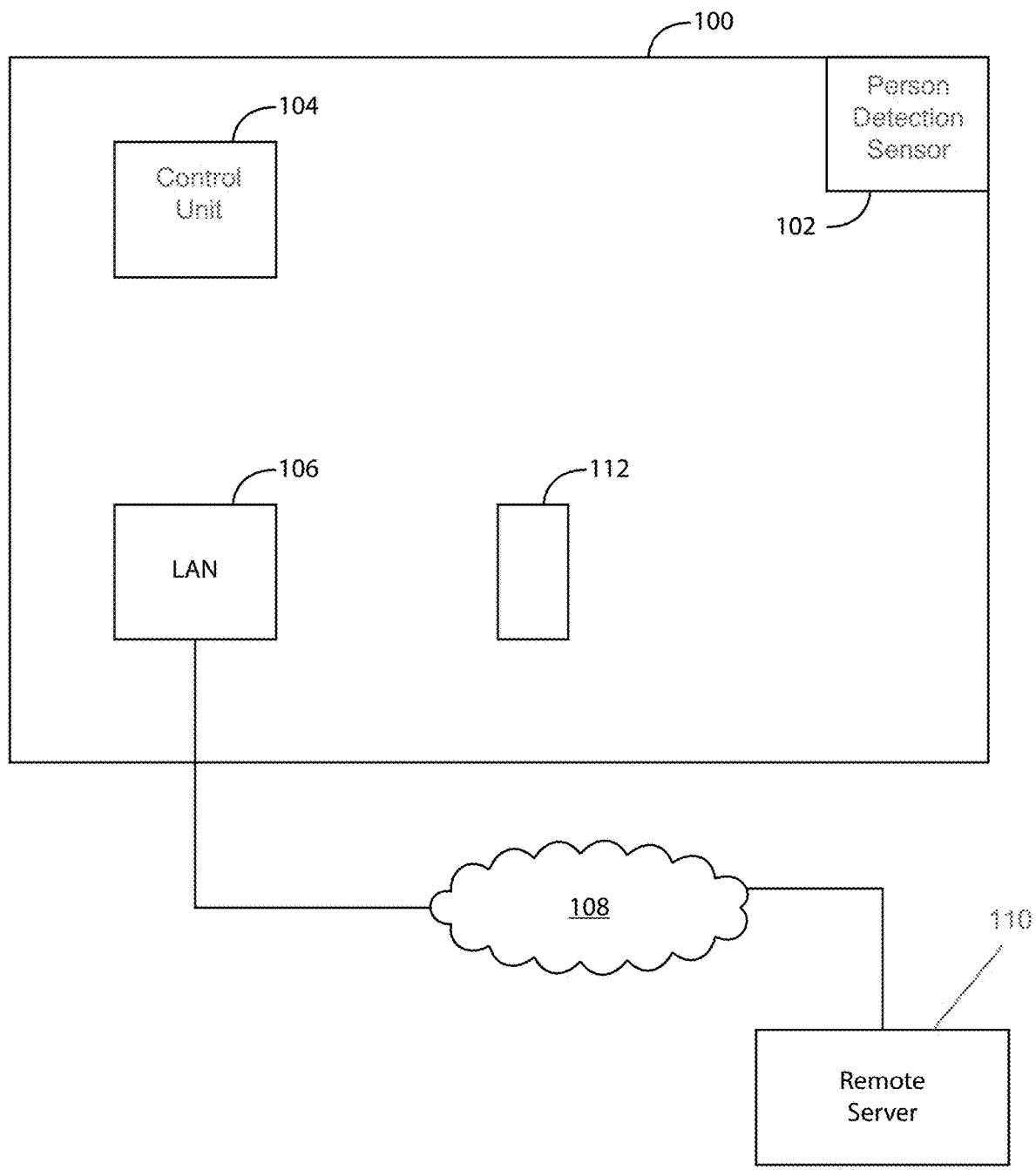
FIG. 1 illustrates one embodiment of a system for reducing power-consumption of battery-powered, wireless sensors.

FIG. 1 illustrates a top, plan view of a system for reducing power consumption of battery-powered, wireless sensors. Although FIG. 1 depicts an area 100 being monitored by a home security system comprising a security panel and single, person detection sensor, it should be understood that the concepts described with respect to FIG. 1 could be applied to other sensing systems, such as HVAC systems, home automation systems, home monitoring systems, etc. and that in any such systems, multiple sensors are typically used. For example, in home security systems, a security panel will often monitor numerous door and window sensors, as well as one or more motion sensors. A home automation system may monitor numerous occupancy sensors, light sensors, door or window sensors, etc. Motion sensors and occupancy sensors may be referred to herein collectively as "person detection sensors".

Area 100 generally comprises a room, hallway, entryway, or some other portion of a residence or business. Person detection sensor 102 comprises a battery-powered, wireless sensor for determining the presence, and/or absence, of one or more persons in area 100. Person detection sensor 102 may comprise a motion detector using passive infra-red (PIR) detection techniques, as known in the art, to detect infra-red heat as a person moves across area 100. Person detection sensor 102 may, alternatively or in combination, comprise an occupancy sensor, used to determine the presence of one or more persons in area 100 using techniques such as ultrasonic, infra-red, thermal, or other well-known techniques to determine if a person is occupying area 100. Unlike traditional motion (PIR) sensors, occupancy sensors generally do not require movement of a person in order to detect their presence.

Person detection sensor 102 may transmit a signal indicative of the presence of a person to a remote device, such as to control unit 104, upon detection of a person in area 100. In one embodiment, control unit 104 comprises a home security panel, gateway, hub or some other device that monitors person detection sensor 102, as well as other sensors and/or home monitoring and control devices, installed within area 100 or other areas of a home or business. Examples of control unit 104 include a GC3 Security & Control panel sold by Nortek Security and Control, Inc., a base station sold as part of an alarm security kit by Ring, Inc., a Pulse® interactive touch screen panel sold by ADT, Inc. In other embodiments, control unit 104 may not be used. In these embodiments, person detection sensor 102 is monitored by a remote server 110 in communication with person detection sensor 102 via a wide-area network 108, such as the Internet, and a local-area network (LAN) 106, such as a home Wi-Fi network. In the remaining disclosure, any reference to control unit 104 may include reference to remote server 110. In some embodiments, control unit 104 comprises both security and home monitoring and control functionality. Finally, control unit 104 may communicate with remote server 110 via local-area network 106 and wide-area network 108 where control unit 104 lacks independent means to send alerts or other information externally to area 100.

When control unit 104 receives a signal from person detection sensor 102 (or some other security or home monitoring sensor) indicative of a detected event, condition or characteristic, control unit 104 may perform one or more actions, such as to contact a remote, security monitoring facility (similar to remote server 110) via wide-area network 108, or by some other means, such as via cellular communication technology. Alternatively, or in addition, control unit 104 may cause a siren (not shown) inside of area 100, or elsewhere in another location inside a home or business, to sound, and/or a strobe light (not shown) to flash.

In prior art home security systems, control unit 104 may be placed into various operating modes or states, representing a state of the security system, including a "home-armed" state, where control unit 104 is configured to react to perimeter sensors, such as door and window sensors, garage door sensors, glass breakage sensors, and outdoor motion detectors, an "away-armed" state, where control unit 104 is configured to react to signals received from the perimeter sensors plus indoor motion detectors, light detectors, occupancy sensors, or other sensors that detect the presence of a person inside a home or business, and an "off" state, where control unit 104 is configured to ignore signals from all of the sensors. Embodiments of the invention serve to disable certain sensors depending on an operating mode of the security system, and then re-enabling the sensors when the security system is placed into a different mode of operation.

Disabling a sensor is performed by a sensor itself, after receipt of a signal or command from control unit 104. "Disabling" as used herein means disabling a sensing function of a sensor (i.e., disabling a passive infra-red detector in a motion sensor, or by ignoring signals sent to a processor in the sensor from a detector in the sensor, i.e., ignoring signals from an infra-red sensor as part of a motion detector, ignoring signals from a reed switch as part of a door or window sensor, ignoring signals from a thermal detector as part of an occupancy sensor, etc.). In other embodiments, a sensor may disable itself by disabling a transmitter as part of the sensor. In yet another embodiment, a sensor disables itself by the processor continuing to process signals from a detector as part of the sensor, but failing to provide a signal to the transmitter that would normally be sent upon the sensor detecting a sensed condition (such as door/window open/close status, motion detected, occupancy detected, temperature, humidity, pressure, etc.). Disabling may also include reducing a duty cycle of the sensor's receiver. Disabling may also comprise a combination of the foregoing.

When a sensor becomes disabled, only certain functions are affected (such as ability to detect conditions, processing signals from a detector, or certain transmitting functions). However, other functions remain operational, such as an ability to receive and process signals from control unit 104 and, in some embodiments, transmission of a "heartbeat' signal that is used in many sensing systems in order to determine if sensors are active and have not become damaged or otherwise unable to transmit. For example, in home security systems, wireless sensors typically transmit a heartbeat signal once every 24 hours to inform control unit 104 that each sensor is working property and able to transmit.

Figure 2:
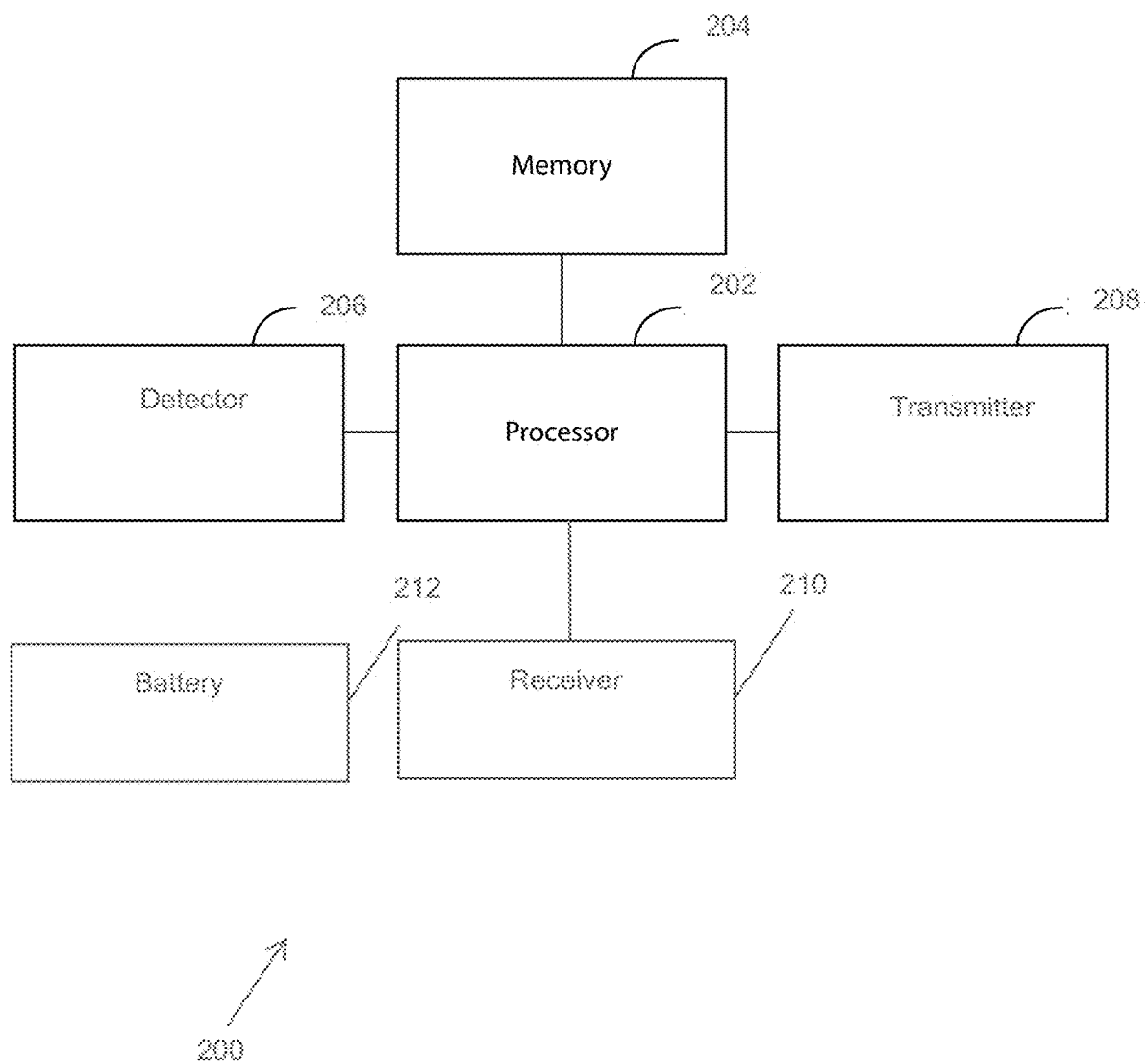
FIG. 2 is a functional block diagram of one embodiment of a battery-powered, wireless, power-saving sensor 200 used in the system as shown in FIG. 1.

FIG. 2 is a functional block diagram of one embodiment of a battery-powered, wireless, power-saving sensor 200, such as person detection sensor 102, in accordance with the teachings herein. It should be understood however that the functional blocks as shown in FIG. 2 could apply to other types of sensors, such as temperature sensors, humidity sensors, pressure sensors, light sensors, door/window sensors or any battery-powered sensor. In this embodiment, person detection sensor 102 comprises a processor 202, a memory 204, a detector 206, a transmitter 208, a receiver 210, and a battery 212. It should be understood that the functional blocks may be connected to one another in a variety of ways, that additional function blocks may be used (for example, amplification or filtering), and that not all functional blocks necessary for operation of person detection sensor 102 are shown for purposes of clarity.

Processor 202 is configured to provide general operation of the sensor by executing processor-executable instructions stored in memory 204, for example, executable code. Processor 202 typically comprises a general purpose processor, such as an ADuC7024 analog microcontroller manufactured by Analog Devices, Inc. of Norwood Mass., although any one of a variety of microprocessors, microcomputers, microcontrollers, and/or custom ASICs selected based on size, cost, power consumption, computing power, and/or other factors.

Memory 204 is coupled to processor 202 and comprises one or more non-transitory, information storage devices, such as RAM, ROM, flash memory, or virtually any other type of electronic, optical, or mechanical information storage device. Memory 204 is used to store the processor-executable instructions for operation of the sensor and, in some embodiments, historical sensed information from the detector, as well as any information used by processor 202, such as one or more thresholds, setpoints, or communication information (such as an IP address, a MAC address, or other information needed to communicate with control unit 104) or a dwell time that defines how often the sensor may transmit. Memory 204 could, alternatively or in addition, be part of processor 202, as in the case of a microcontroller comprising on-board memory.

Detector 206 is coupled to processor 202 and comprises a device and sometimes related circuitry and/or firmware, to detect event, conditions or characteristics occurring in proximity to the sensor. Examples of detector 204 comprise a reed switch in the case of a door or window sensor, a passive infra-red detector in the case of a motion detector, an accelerometer in the case of other door or window sensors or garage door tilt sensors, a mems sensor in the case of a garage door tilt sensor, a thermopile as in the case of an occupancy sensor, a thermometer in the case of a remote thermal probe, a pressure sensor in the case of a remote sensor pressure, a carbon monoxide detector in the case of a carbon monoxide sensor, a camera in the case of a remote camera, etc.

Transmitter 208 is coupled to processor 202 and comprises circuitry necessary to transmit wireless signals to control unit 104, typically via local-area network 106 and/or personal communication device 112, which comprises any fixed or mobile communication device such as a mobile phone, tablet computer, laptop computer, desktop computer, etc. Such circuitry is well known in the art and may comprise BlueTooth, Wi-Fi, Z-wave, Zigbee, X-10, RF, optical, or ultrasonic circuitry, among others.

Receiver 210 is coupled to processor 202 and comprises circuitry necessary to receive wireless signals from control unit 104, typically via local-area network 106 and/or personal communication device 112. Such circuitry is well known in the art and may comprise BlueTooth, Wi-Fi, Z-wave, Zigbee, X-10, RF, optical, or ultrasonic circuitry, among others.

Battery 212 comprises power source for sensor 200, providing approximately 3-9 volts of DC power. Common battery types suitable for sensor 200 comprise coin cells, double A, triple A, etc.

Figure 3:
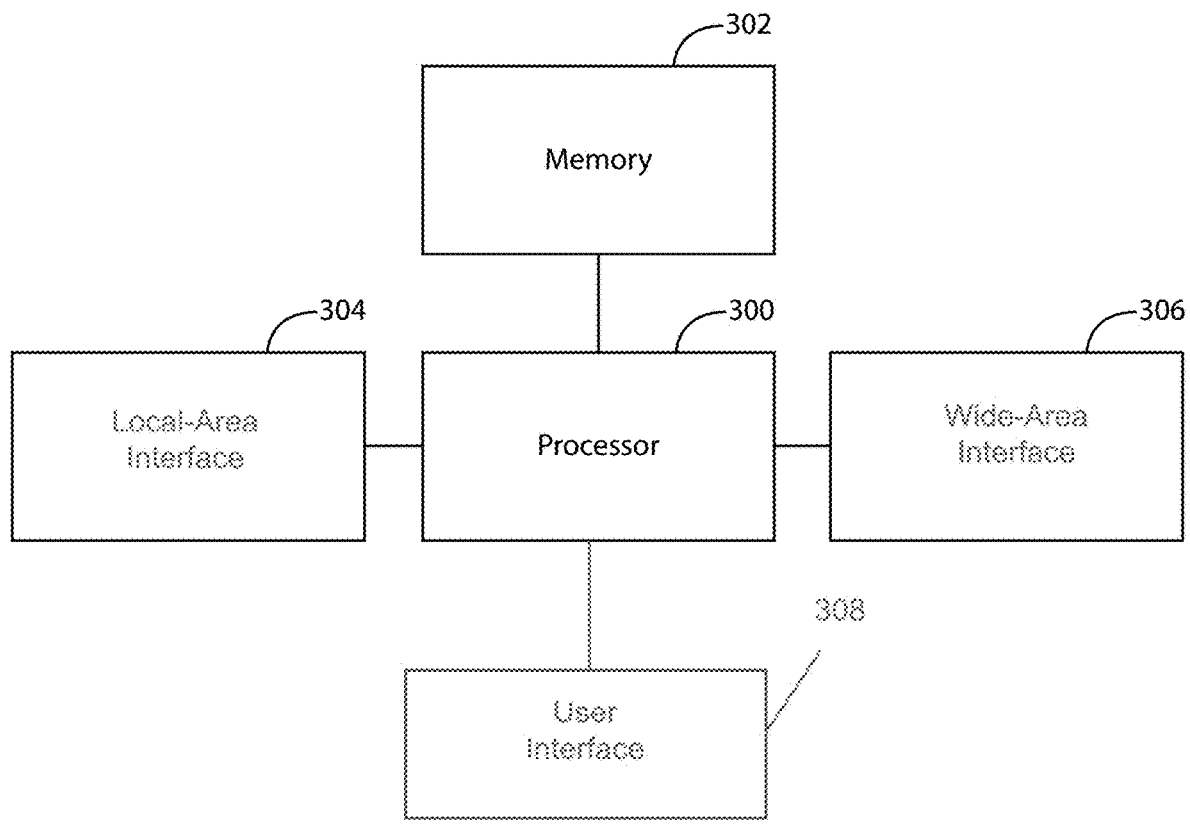
FIG. 3 is a functional block diagram of a control unit as shown in FIG. 1.

FIG. 3 is a functional block diagram of one embodiment of control unit 104, showing processor 300, memory 302, local-area interface 304, wide-area interface 306, and user interface 308. It should be understood that the functional blocks shown in FIG. 3 may be connected to one another in a variety of ways, and that not all functional blocks necessary for operation of personal communication device 112 are shown (such as a power supply), for purposes of clarity.

Processor 300 is configured to provide general operation of control unit 104 by executing processor-executable instructions stored in memory 302, for example, executable code. Processor 300 typically comprises one or more microprocessors, microcontrollers, or custom ASICs that provide routine functionality, i.e., monitor one or more sensors and cause certain actions to occur in response to receiving signals from the sensors, as well as to alert sensors when control unit has entered certain operating modes.

Memory 302 is coupled to processor 300 and comprises one or more non-transient information storage devices, otherwise referred to as one or more processor-readable mediums, such as RAM, flash memory, or virtually any other type of electronic, optical, or mechanical information storage device. Memory 302 is used to store the processor-executable instructions for operation of control unit 104.

Local-area interface 304 is coupled to processor 300 and comprises circuitry necessary to wirelessly transmit and receive information to/from the sensors. Such circuitry may comprise one or more of Wi-Fi, Bluetooth, or some other short-range, wireless communication circuitry. Such circuitry is generally well known in the art.

Wide-area interface 306 is coupled to processor 300 and comprises circuitry necessary to transmit and receive information to/from server 110 and/or a remote monitoring center, in one embodiment, via cellular or satellite communication circuitry. In one embodiment, the functionality of wide-area interface is incorporated into local-area interface 304 in the form of Wi-Fi or Bluetooth circuitry that routes communications from control unit 104 to remote server 110 or remote monitoring center via local-area network 106 and wide-area network 108. Such circuitry is generally well known in the art.

User interface 308 comprises a touchscreen, one or more pushbuttons, knobs, light emitters, or other devices to allow an authorized person to change an operating mode of control unit 104.

FIG. 4 is a flow diagram illustrating one embodiment of method, or algorithm, performed by sensor 200 and control unit 104, for reducing power consumption by sensor 200. While FIG. 4 references a home security system, where control unit 104 and sensor 200 communicate with each other, it should be understood that the method of FIG. 4 could be used in other applications, such as HVAC, home automation, home monitoring, or any other application that utilizes battery-powered sensors. It should further be understood that in some embodiments, not all of the steps shown in FIG. 4 are performed and that the order in which the steps are carried out may be different in other embodiments. It should be further understood that some minor method steps have been omitted for purposes of clarity.

The process begins at block 400, where a security system defined by control unit 104 and sensor 200 is operating in an armed-away mode or state. In this mode, generally no one is within premises 100 and the control unit 104 responds to any alarm conditions sensed by sensor 200, such as a door or window opening, motion inside premises 100 detected, glass being broken, etc. Control unit 104 receives alarm signals transmitted by sensor 200 in response to sensor 200 detecting one or more events, conditions or characteristics in proximity to sensor 200 via local interface 304 and, in response, causes one or more actions to occur, such as sounding a loud siren inside premises 100 and/or alerting a remote monitoring center via wide-area interface 306. Further, at this block, sensor 200 is operating in a normal mode, transmitting alarm signals when it detects an alarm condition, transmitting a heartbeat signal at predetermined intervals, and processing signals received from control unit 104.

At block 402, an authorized person enters premises 100 and places control unit 104/the security system into either an "off" state or an "armed-home" state, typically using user interface 308 or personal communication device 112 to do so, as is well-known in the art.

In response to control unit 104 being placed into a different operating state (i.e., off or armed-home), at block 404, processor 300 transmits a signal to sensor 200, indicative of the new operating mode or state. Of course, if more than one sensor 200 is used with control unit 104, the signal is transmitted to any sensor capable of receiving the signal and having been previously recognized by control unit 104 during a "learn" process, as is well-known in the art.

The signal transmitted by processor 300 at block 404 may comprise a command or an indication of the present operating state. If a command is transmitted, the command instructs sensor 200 to enter into a power-saving mode of operation. The command may be transmitted to all sensors or, more likely, a separate command is transmitted for each sensor that is to be placed into a power-saving mode of operation, as identified by an ID code, serial number or other unique identifier assigned to each sensor and stored in memory 204. If an indication of the present operating state is transmitted (i.e., off or armed-home), processor 300 may transmit a code representative of the current operating state, such as 0 for armed-home, 1 for armed-away and 2 for off. In one embodiment, only certain types of sensors are placed into a low-power state for each operating mode of control unit 104. For example, in an armed-home state, processor 300 may only transmit a command or indication to motion sensors, leaving all perimeter sensors (such as door and window sensors) in a normal mode of operation. In an off state, processor 300 may send a command or indication to all of the sensors.

At block 406, the signal from control unit 104 is received by sensor 200 via receiver 210 and provided to processor 202.

At block 408, processor 202 processes the signal. If a command was sent, processor executes the command in accordance with the processor-executable instructions stored in memory 204, i.e., place sensor 200 into a power-saving mode of operation. If an indication of the present operating state was received, processor 202 may place sensor 200 into a power-saving mode of operation if the indication indicates that control unit 104/security system is in one or more particular operating states, i.e., armed-home or off.

Not all sensors will be placed into a power-saving mode of operation when a signal from control unit 104 is received. For example, a door or window sensor will be placed into a power-saving mode of operation only when it either receives a command from control unit 104 to do so, or upon receipt of an operating state of "off". It is desirable to keep the door and window sensors active, i.e., reporting any sensed alarm conditions to control unit 104, in an armed-away or armed-home mode of operation. Motion sensors, on the other hand, are placed into a power-saving mode of operation when either a command to do so is received from control unit 104, or upon receipt of an indication that control unit 104/security system is in either an "off" mode of operation or an armed-home mode.

Processor 202 may place sensor 200 into a power-saving mode of operation using one or more of a variety of techniques. In one embodiment, processor 202 disables detector 204, i.e., removes power from detector 204, interrupts communications between detector 204 and processor 202, or otherwise prevents detector 204 from detecting a condition proximate to sensor 200, such as a door or window becoming open or closed, motion occurring, a temperature, a humidity, a pressure, etc.

In another embodiment, processor 202 places sensor 200 into a power-saving mode of operation by ignoring signals from detector 204 by processor 202. This may mean that processor 202 does not respond to any signals sent to it by detector 204, or that processor 202 does, in fact, continue to process the signals, but that processor 200 does not cause transmitter 208 to transmit an alarm signal when an alarm condition is determined to be present by detector 204 and processor 202.

In yet another embodiment, processor 202 places sensor 200 into a power-saving mode of operation by disabling transmitter 208. This may comprises removing power from transmitter 208, disconnecting transmitter 208 from processor 202, lowering the transmission power of transmitter 208 to a level where an alarm signal would not be received by control unit 104, etc.

In yet still another embodiment, in addition to any of the foregoing power-saving processes, placing sensor 200 into a power-saving mode of operation additionally comprises reducing a duty cycle of receiver 210. For example, during normal operation, receiver 210 may be powered on for 10 milliseconds every second in order to determine of a signal has been transmitted by control unit 104. In the power-saving mode of operation, processor 200 may reduce the duty cycle to power up for, for example, 10 milliseconds every 10 seconds. Reducing the duty cycle provides additional power-savings to sensor 200.

At block 410, processor 202 may cause transmitter 208 to transmit an acknowledgement that the command or status indication had been successfully received. This may occur before or after processor 202 disables sensor 200.

At block 412, processor 202 determines that it is time to transmit a heartbeat signal to control unit 104.

At block 414, processor 202 re-enables transmitter 208 if transmitter 208 was disabled at block 406.

At block 416, processor 202 causes transmitter 408 to transmit the heartbeat signal to control unit 104.

At block 418, processor 202 again disables transmitter 208 if transmitter 208 was re-enabled at block 412.

At block 420, at some later time, an authorized person changes the mode of operation of control unit 104/security system to a different operating mode.

At block 422, processor 300 transmits a signal to sensor 200, comprising a command or operating status of control unit 104 in response to the authorized person changing the mode of operation.

At block 424, sensor 200 receives the signal from control unit 104 via receiver 210 and provides the signal to processor 202.

At block 426, processor 202 processes the signal. If a command was sent, processor executes the command in accordance with the processor-executable instructions stored in memory 204, i.e., re-enable sensor 200 by re-enabling detector 204, begin to process signals from detector 204 once again, re-enable transmitter 208, etc. If an indication of the present operating state was received, processor 202 may re-enable sensor 200 if the indication indicates that control unit 104/security system is in one or more particular operating states, i.e., armed-away in the case of a motion sensor or armed-home or armed-away in the case of a door or window sensor.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A battery-operated, wireless, power-saving sensor, comprising:
   a detector for detecting a condition occurring proximate to the sensor;
   a memory for storing processor-executable instructions;
   a transmitter for sending a wireless signal to a security system panel;
   a receiver for receiving wireless signals from the security system panel; and
   a processer coupled to the detector, the memory, the receiver and the transmitter, for executing the processor-executable instructions that causes the sensor to:

receive, by the processor via the receiver, a first signal from the security system panel; and
in response to receiving the first signal, transition, by the processor, the sensor from an enabled state to a disabled state;
wherein in the enabled state the sensor will transmit via the transmitter the wireless signal to the security system panel in response to the detector detecting the condition occurring proximate to the sensor, in both the enabled state and the disabled state the sensor will cause itself to periodically transmit via the transmitter to the security system panel a heartbeat signal, and in the disabled state the transmitter is one of powered off, disconnected from the processor, and operated with a transmission power incapable of sending a signal to the security system panel other than when the transmitter is used to transmit the heartbeat signal.

2. The sensor of claim 1, wherein the first signal comprises an operating status of the security system panel.

3. The sensor of claim 2, wherein the sensor comprises a motion detector.

4. The sensor of claim 1, wherein the first signal comprises a command from the security system panel to disable the sensor.

5. The sensor of claim 1, wherein the instructions further comprise instructions that causes the sensor to:
receive, by the processor via the receiver, a second message from the security system panel while the sensor is in the disabled state; and
transition, by the processor, the sensor from the disabled state back to the enabled state in response to receiving the second message.

6. The sensor of claim 1, wherein the processor-executable instructions cause the sensor to respond to receiving the first signal by reducing, by the processor, a duty cycle of the receiver.

7. A method performed by a battery-operated, wireless, power-saving sensor having a processor connected to each of a detector for detecting a condition occurring proximate to the sensor, a receiver for receiving wireless signals from a security system panel, and a transmitter for sending a wireless signal to the security system panel, comprising:
receiving, via the receiver, a first signal from security system panel; and
in response to receiving the first signal, transitioning the sensor from an enabled state to a disabled state;
wherein in the enabled state the sensor will transmit via the transmitter the wireless signal to the security system panel in response to the detector detecting the condition occurring proximate to the sensor, in both the enabled state and the disabled state the sensor will cause itself to periodically transmit via the transmitter to the security system panel a heartbeat signal, and in the disabled state the transmitter is one of powered off, disconnected from the processor, and operated with a transmission power incapable of sending a signal to the security system panel other than when the transmitter is used to transmit the heartbeat signal.

8. The method of claim 7, wherein the first signal comprises an operating status of the security system panel.

9. The method of claim 8, wherein the detector comprises a motion detector.

10. The method of claim 7, wherein the first signal comprises a command from the security system panel to disable the sensor.

11. The method of claim 7, further comprising:
receiving, via the receiver, a second message from the security system panel while the sensor is in the disabled state; and
transitioning the sensor from the disabled state back to the enabled state in response to receiving the second message.

12. The method of claim 7 further comprising responding to receiving the first signal by reducing a duty cycle of the receiver.

13. A method performed by a battery-operated, wireless, power-saving sensor having a processor connected to each of a detector for detecting a condition occurring proximate to the sensor, a receiver for receiving wireless signals from a security system panel, and a transmitter for sending a wireless signal to the security system panel, comprising:
receiving, via the receiver, a first signal from the security system panel; and
in response to receiving the first signal, transitioning the sensor from an enabled state to a disabled state;
wherein in the enabled state the sensor will transmit via the transmitter the wireless signal to the security system panel in response to the detector detecting the condition occurring proximate to the sensor, in both the enabled state and the disabled state the sensor will cause itself to periodically transmit via the transmitter to the security system panel a heartbeat signal, and in the disabled state the transmitter is one of powered off, disconnected from the processor, and operated with a transmission power incapable of sending a signal to the security system panel other than when the transmitter is used to transmit the heartbeat signal.

14. The method of claim 13 further comprising responding to receiving the first signal by reducing a duty cycle of the receiver.

* * * * *